Patented Apr. 25, 1950

2,505,068

UNITED STATES PATENT OFFICE 2,505,068

CATALYTIC PHOTOPOLYMERIZATION PROCESS AND COMPOSITIONS

Carrol C. Sachs, North Hollywood, and John Bond, West Los Angeles, Calif., assignors to Alexander H. Kerr & Co., Los Angeles, Calif., a corporation of Nevada No Drawing. Application September 29, 1947, Serial No. 776,872

26 Claims. (Cl. 204—162)

The photochemical polymerization of ethylenically unsaturated monomers and low molecular weight polymers of such unsaturated monomers has been described in the prior art and it has also been shown that certain compounds have the property of catalyzing their photochemical polymerization.

Photopolymerization catalysts have been suggested in the prior art, which contain chromophor groups or groups which form chromophor groups in the course of the polymerization. The latter type is hereafter called "chromophor formers." It is obvious that when used with clear, i. e., uncolored, translucent or transparent resins, the polymerization by the aid of such catalysts imparts some color to the polymerized resins.

We have discovered that the halomethyl naphthalenes are active photopolymerization catalysts when employed to initiate or accelerate the photochemical polymerization of photopolymerizable organic compounds containing resinophoric groups. Certain of these catalysts are colorless and do not impart color to the polymer during the polymerization process in which the monomer or partial polymer is polymerized to a polymer of higher molecular weight.

It is generally well known that certain of the organic resinophoric compounds are light-sensitive in that light reduces the induction period or increases the rate of polymerization. Such compounds are those resinophoric compounds which contain radicals which include an ethylene linkage and which polymerize according to the vinyl type of polymerization. Such compounds have been classed as vinyl types (see Plastics, Resins and Rubber, by Paul O. Powers, Chemical and Engineering News, Oct. 25, 1946, vol. 24, No. 200, page 2784).

These include the acrylic resins, i. e., resins produced by polymerization of acrylic acid or derivatives of acrylic acid, for example, methyl acrylic acid, or methyl, ethyl, butyl acrylate, methyl methacrylate, ethyl methacrylate, butyl methacrylate, isobutyl methacrylate. Such types also include styrene and its derivatives, for example, styrene and the alkyl nuclear substituted styrenes, such as ortho or metamethyl styrene or the chlorinated styrenes. It also includes chloroprene. This type also includes the allyl compounds, such as allyl alcohol and allyl alcohol condensed with poly basic acids, as in allyl maleate or allyl phthalate or the condensate of allyl alcohol with polybasic acids and polyhydric alcohols to form suitable copolymers.

Such types also include vinyl acetate, vinyl halides, for example, vinyl chloride and vinylidene halides, for example, vinylidene chloride.

The addition of a small amount of the photopolymerization catalyst of our invention to the photopolymerizable monomers or partial polymers positively catalyzes the photopolymerization materially.

These catalysts are also active for mixed monomers or mixed partial polymers or for the polymerization of mixed monomers or mixed partial polymers capable of copolymerization. Our catalysts catalyze the photopolymerization of copolymers of esters of unsaturated glycols such as ethene or butene diols and unsaturated dicarboxylic acids, such as maleic, fumeric or itaconic acid, or copolymers thereof with the above vinyl type of resinophoric compounds, as, for example, vinyl acetate or styrene.

Thus, these catalysts are active in the photopolymerization of the allyl esters and particularly the allyl esters of the polycarboxylic acid, such as diallyl maleate or diallyl phthalate and their copolymers with the above vinyl type resinophors.

Polyglycol esters of acrylic and methacrylic esters and their copolymers with the resinophors of the vinyl type as stated above are also included.

Cross linking agents may be employed which contain two or more terminal ethylene linkages ($CH_2=C<$) which may enter into a vinyl type of polymerization. These include ethylene dimethacrylate; allyl methacrylate; methallyl methacrylate; ethylene glycol dimethacrylate; hexamethylene glycol dimethacrylate; dimethallyl carbonate; and similar compounds.

All of the above resinophoric compounds contain $>C=C<$ (ethylenic) linkages in resinophoric arrangement. As stated above, certain of them are of the vinyl type and others, particularly certain of the ester types, are not all strictly classifiable as vinyl type polymers, in that their polymerization is not strictly of the vinyl type, since cross linkage to form three-dimensional resins is also possible. These may be classed as the nonvinyl ester type resinophors. They are all classifiable as ethylenically unsaturated resinophors and since, especially when catalyzed by our catalysts, they are photochemically polymerizable, they may thus be classed as ethylenically unsaturated photochemically polymerizable resinophoric compounds.

We have found that such catalytic activity is found not only in the halomethyl naphthalenes but there may be other substituents such as the non-polar alkyl substituents, for example, methyl or ethyl groups which do not appear to deleteriously affect the reactivity of our catalysts.

Electronegative polar substituents may also be included, as, for example, other haloalkyl substituents, or alkoxy, hydroxy, halogen, haloalkyl groups, or sulphonic or carboxylic groups. All of these are classifiable as electronegative in contradistinction to the NH₂ group which is usually regarded as electropositive.

We, therefore, have discovered that the halomethyl naphthalenes and their non-polar or electronegative polar substitution products are active photochemical polymerization catalysts for the photopolymerization of the ethylenically unsaturated photochemically polymerizable resinophoric compounds, including photopolymerization of such resinophors with others of the vinyl type or of the non-vinyl ester type.

We prefer, when we desire to produce a colorless polymer, such as a clear transparent material, or, where the color imparted by the catalyst would be undesirable to employ such compounds which do not contain the active chromophor groups which impart strong color to the polymer or do not contain groups which, on reaction, form the strong chromophor groups. Such strong chromophor groups include the following:

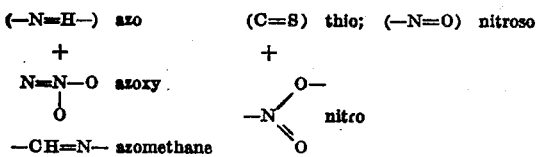

The polynuclear hydrocarbons, having condensed rings greater than 2, are more sensitive to chromophor action than is naphthalene, in that weak chromophor groups, which do not impart color to naphthalene, may impart color to anthracene, phenanthrene, etc.

Certain groups such as the >C=C carbonyl are known to be chromophoric, especially when present in multiple or when present together with the co-called auxochrome groups. These auxochrome groups may not of themselves impart color but when present, in addition to the chromophor, augment the action of the chromophor group.

These auxochrome groups include the amino or substituted amino groups, the hydroxyl and the methoxy groups, or the halogen group. We, therefore, employ, when we wish to avoid imparting color to the resin, a haloalkyl substituted polynuclear aromatic containing condensed benzene rings either not further substituted by other groups or, if so substituted, not substituted by chromophor or chromophor-forming group or groups.

A further desirable property is that the catalyst be soluble or colloidally dispersible in the monomer or partial polymer in which it is to be employed.

Examples of the photochemical catalytic compounds of our invention are alpha-chlormethyl naphthalene, beta-chlormethyl naphthalene, 1,4-dichlormethyl naphthalene, 1,5-dichlormethyl naphthalene, and the beta substituted analogues, for example, 2,3-dichlormethyl naphthalene or the 2,6-dichlormethyl naphthalene. One of the chlormethyls may be in the alpha position and the other in the beta position. Bromomethyl or iodo-methyl analogues of each of the above chlormethyl compounds are also included in this grouping as examples.

The halomethyl naphthalene, wherein halogen is chosen in the series of the periodic arrangement of elements of series number higher than 1, i. e., iodine, bromine or chlorine, are included as preferred as the halogen substituent in the haloalkyl groups among the catalysts of our invention.

As explained above, we may also employ such compounds having additional alkyl, alkoxy, hydroxy, halogen or haloalkyl substituted in the ring.

The following examples given as illustrative and not as limitations of our invention, illustrate the activity of the group of photochemical catalysts generically defined above:

*Example 1*

A one per cent solution of alpha-chlormethyl naphthalene was made in methyl methacrylate monomer and exposed to direct sunlight in a glass vial. A like glass vial containing methyl methacrylate monomer and no catalyst was also exposed to direct sunlight for the same time as a control blank. The catalyzed monomer set to a hard gel in one-half hour while the uncatalyzed monomer did not undergo any apparent polymerization.

*Example 2*

In a like experiment a 1% solution of the alpha-bromomethyl naphthalene caused the formation of a hard gel of the methyl methacrylate monomer in one hour when exposed according to the procedure of Example 1 under somewhat different sunlight conditions. In like manner a 1% solution of the beta-bromomethyl naphthalene in methyl methacrylate caused the formation of a hard gel under the same conditions in about one hour. The uncatalyzed monomer was apparently unpolymerized in all of the above cases.

*Example 3*

3% alpha-chlormethyl naphthalene was dissolved in methyl methacrylate monomer, placed in a closed glass vial, and subjected to the rays of a 250 watt mercury vapor ultra-violet light quartz bulb a distance of 4 inches. A similar vial containing an equal amount of uncatalyzed monomer was also so exposed. Air was circulated over the samples to maintain both vials at room temperature. The catalyzed monomer set to a hard gel in 7 hours while the uncatalyzed monomer was apparently unpolymerized.

*Example 4*

A 1% solution of beta-chlormethyl naphthalene was made in methyl methacrylate monomer and treated in the manner described for Example 3. It gelled in five hours and set solid and hard (containing about 60% polymer) in seven hours, while the uncatalyzed monomer blank was substantially unpolymerized and showed substantially no change in viscosity.

*Example 5*

2% solution of 1,5 dichlormethyl naphthalene was subjected to the procedure of Example 3 and cured hard in one hour and thirty minutes. In the same experiment a 2% solution of alpha-chlormethyl naphthalene in methyl methacrylate monomer cured hard in two hours, while the blank of the uncatalyzed methyl methacrylate was substantially unpolymerized.

Example 6

1% solution of beta methoxy-alpha chlormethyl naphthalene was exposed according to Example 3 and gelled hard in three hours while the blank was unaffected.

Example 7

A ring chlorinated chlormethyl naphthalene was obtained by chlorination of a mixture of alpha and beta methyl naphthalene under conditions such that chlorine went into the ring as well as the side chains. The mixture of alpha and beta methyl naphthalene was distilled and the vapor passed through a Pyrex tube into which chlorine was introduced at a rate to establish a mixture in the tube of about 0.75 mol of $Cl_2$ to 1 mol of the methyl naphthalene. The tube was illuminated by a quartz mercury vapor lamp. The vapor and gases passing from the tube were condensed and the condensate refractionated by distillation at 17 mm. absolute pressure. The fraction boiling between 172–179° contained mixed alpha and beta-chlormethylnaphthyl chloride. The fraction boiling between 176 and 187° contained chlormethylnaphthyl chloride of higher degrees of ring chlorine substitutions. A 1% solution of each of the fractions was made in methyl methacrylate and exposed to sunlight according to the procedure of Example 1 and others to the ultra-violet light according to the procedure of Example 3 with the following results:

| Fraction B. P. | Sunlight, Hours | Exposure Result | Ultra-violet light, Hours | Exposure Result |
|---|---|---|---|---|
| 172–179 | 2¾ | Gel | 6 | Hard gel. |
| 176–187 | 2¾ | Near gel | 4 | Do. |

Uncatalyzed blanks of the methyl methacrylate monomer shower substantially no change when exposed under the conditions and for the times given in the above table.

Example 8

Alpha-chlormethyl beta naphthol was formed by mixing equimolar quantities of beta naphthol and formaldehyde (40% solution) and adding slowly with vigorous stirring an equi molar amount of hydrochloric acid at room temperature. Water was added with vigorous stirring as soon as the reaction product formed a homogeneous syrup. The water solution was neutralized with sodium carbonate. The oily layer was separated and may be used as a photopolymerization compound or the alpha-chlormethyl beta naphthol may be purified by dissolving in ether and shaking with sodium carbonate or other suitable drying agent. The ether may be evaporated to give a viscous material which if allowed to stand will harden into a high molecular weight polymer.

The reaction product, particularly in its unpolymerized state or partially polymerized state, is an active photopolymerization polymer and is as active as alpha-chlormethyl naphthalene.

This when used in place of alpha-chlormethyl naphthalene in the procedures of Examples 1 or 3 is as active and perhaps more active than alpha-chlormethyl naphthalene. When similarly irradiated the uncatalyzed resinophor showed substantially no change.

The rate of polymerization and/or its induction period was affected by the per cent of catalyst employed but the effect was apparently exponential in character.

Example 9

This example illustrates the effect of the concentration of the photopolymerization catalyst on the rate of polymerization of methyl methacrylate in bulk at 30° C. A series of methyl methacrylate samples containing .003, .03, .3, and 3.0% of alpha-chlormethyl naphthalene was prepared and placed in glass vessels. The samples were then irradiated with light from a 250 watt mercury vapor lamp, operating at a distance of 3½ inches from the specimens. The specimens were allowed to polymerize to a solid (about 60% polymer). The time required for this degree of polymerization is given in the second column.

| Per cent alpha-chlormethyl naphthalene | Time in hours |
|---|---|
| 3.0 | 7. |
| 0.3 | 9½. |
| 0.03 | 11. |
| 0.003 | 25. |
| None (control) | Still fluid after 100 hours exposure. |

It will be observed that the major improvement was in the first addition of .003% and further increase in concentration had a diminishing effect on the polymerization. The amount of catalyst employed will depend, therefore, on the desired rate of polymerization and also on the specific activity of the particular catalyst under consideration as well as on the intensity of the illumination by the polymerizing light. It will also be found that an excessive concentration of catalyst may interfere with the polymerization and be detrimental. Thus the rate of acid may increase with increase of concentration of catalyst as described above, and if the catalyst concentration is made excessive it may again decrease, that is, there is an optimum concentration for each catalyst monomer and photopolymerization condition.

With these considerations in mind it will be found that from about .001% to about 5% of catalyst will be, in most cases, a useful concentration to employ.

The photochemical polymerization of the resins apparently is greatest by light of wave length less than about 3500 Angstroms. Usual photochemical sources of actinically active light such as mercury or carbon arc light or direct sunlight or incandescent filament lamps are thus effective.

The relative effectiveness of various wave lengths and the photochemical nature of the process is illustrated by the following experiment.

Example 10

Samples, each containing 2% of alpha-chlormethyl naphthalene dissolved in methyl methacrylate monomer, where placed in the sun behind glass filters and each sample exposed for nine hours. The samples shaded by filters were contained in open dishes, the surface of the monomer being screened by the indicated filter. The other samples were contained in pyrex test tubes behind the indicated filters. In the following table the nature of the irradiation is indicated by the absorption characteristics of the filter employed.

| Filter Cuts out wave lengths below Angstroms | Result |
|---|---|
| 2,200 | Cured. |
| 2,450 | Do. |
| 2,850 | Do. |
| 3,450 | Very, very slightly viscous. Did not cure. |
| 4,100 | Did not cure. |
| 4,900 | Do. |
| 5,675 | Do. |
| 6,150 | Do. |

The relative effectiveness of the various wave lengths of light will in part depend upon the nature of the catalyst and its concentration as well as on the nature of the resinophor or resulting polymer, as well as the intensities of illumination, and the above table is not intended to indicate that wave lengths longer than 3450 are ineffective other than under conditions specified in the example. Since usual light sources, such as the ultra-violet light sources, as, for example, mercury or carbon arc light or visible light sources, such as incandescent lamps or sunlight, contain suitable actinically active wave lengths they form suitable sources of illumination for the purpose of our invention.

Examples of the activity of the class of catalysts for various types of polymers are illustrated by the following:

Example 11

A 3% solution of alpha-chlormethyl naphthalene was dissolved in the following monomers and subjected to irradiation according to the procedure described in Example 3 for the times indicated in columns 2, 3, and 4:

| Monomer Employed | State after— | | |
|---|---|---|---|
| | 20 Hrs. | 24 Hrs. | 42 Hrs. |
| Styrene and diethyl maleate mixed in equimolar proportions. | Rubbery | | Rubbery. |
| Methyl methacrylate | Solid | | |
| Allyl alcohol | | Vis. increased. | |
| Methyl acrylate | | Cured hard. | |
| Acrylonitrile | | Hard claylike mass. | |
| Styrene | | Vis. increased. | |

Blanks of each of the above monomers (no catalyst) showed substantially no change after the above exposures.

Example 12

1% alpha-chlormethyl naphthalene was dissolved in equimolar mixtures of the following monomers and subjected to illumination by sunlight according to the procedure of Example 1 with the following results:

| Monomers | Time of Illumination | State of Product |
|---|---|---|
| | Hours | |
| Vinyl acetate and methyl methacrylate | 3 | Hard. |
| Methyl methacrylate and methyl acrylate | 4½ | Do. |

Blanks of each of the above uncatalyzed monomers when subjected to irradiation for the times indicated above showed substantially no change.

Example 13

A liquid mixture of triethylene maleate and styrene with a substantially equal ratio of styrene to maleate groups and containing 1% of alpha-chlormethyl naphthalene was irradiated according to the procedure of Example 3 for the times indicated in the table with the following results:

| Time of Irradiation | State of Product |
|---|---|
| 4 Hours | Gelled hard. |
| 19 Hours | Cured hard. |

The blanks (no catalyst) showed substantially no change after similar exposure for 19 hours.

Example 14

The copolymer of the previous Example 13 was mixed with 1% of beta methoxy-alpha-chlormethyl naphthalene and exposed to direct sunlight according to the procedure of Example 1. It gelled in one hour and was hard in three hours.

The blank containing no catalyst showed substantially no change after the three-hour exposure.

The previous examples indicate the utility of the photopolymerization catalysts of our invention in the photopolymerization of monomers and partial polymers according to the so-called bulk method. In such methods the catalyst in the desired percentage is dissolved in monomers or partially bulked or polymerized monomers of sufficiently low viscosity to permit of the incorporation of the catalyst. The resinophoric compound containing the catalyst may be polymerized photochemically by exposing the same to a source of ultra-violet or visible light. Temperature control to prevent excessive generation of heat during polymerization is desirable. The illumination may be by a light source positioned above the exposed surface of the container or where the container is light-transmitting, as when it is of glass, it may be made from a light source through the glass vessel. There are now available ultra-violet light sources which may be suspended inside the reaction vessel and these may be conveniently used.

The vessel may be of the desired shape to form a mold to give a molded casting of desired shape. Photochemical laminations may also be made as when the sheets being laminated are light-transmitting as, for example, if they be made of fibre glass, glass sheets, or plastic mesh or plastic sheets. In such cases the laminate, especially when the resin employed is of the contact type, may be formed into the desired laminate of the desired shape and set by photochemical means, as by exposing the laminate to sunlight or to a special source of illumination as indicated above. The casting or the laminate may be further baked if further hardening or polymerization of the photopolymerized product is desired.

The photopolymerization process may be carried out at low or at elevated temperatures but as the temperatures become high, bubbles and striations may be formed in the castings. Since the catalyzed photopolymerization permits of rapid polymerization at low temperatures to produce bubble free castings, it is usually preferable to cause the reaction to occur at ordinary atmospheric temperatures and, if desired, even at low temperatures, i. e., at temperatures ranging from 5 to 50° C. These temperature limits are not critical and merely indicate that heat is not necessary to cause the reaction to proceed.

However, since thermal polymerization is not inhibited by these catalysts and may also be carried out simultaneously, elevated temperatures are not a hindrance so long as they are not so high as to cause bubbles or other defects, as will be recognized by those skilled in the art.

Photopolymerization employing our catalyst may also be carried out in a solution of the monomer or partial polymer in a volatile solvent. Thus, the monomer or partial polymer containing the catalyst is dissolved in a solvent and introduced into a vessel and illuminated. Usual precautions against the loss of solvent and cooling, where necessary to avoid overheating, may be employed. The solution is illuminated in a manner similar to that described above for bulk polymerization. Instead of polymerizing a bulk quantity solution in a vessel, we may saturate a sheet or a plurality of sheets arranged in laminated form with such solution and photopolymerize in a manner similar to that described above. The solvent may be evaporated either during, prior to, or subsequent to the photopolymerization.

The following example illustrates the effect of our catalyst in photopolymerization of a solution of a monomer in a solvent:

Example 15

A solution containing 100 parts of methyl methacrylate in 200 parts of acetone was divided into two parts. Into one was added one part of alpha-chlormethyl naphthalene. The two solutions were exposed simultaneously in glass containers to the light of a 200 watt mercury vapor quartz lamp at a distance of six inches from the lamp. The yield of polymer precipitated from solution was as follows:

|  | Per cent |
|---|---|
| For catalyzed monomer | 30.5 |
| For uncatalyzer monomer | 1.2 |

Emulsion or granular polymerization may also be employed. Conventional dispersing agents may be used and the process otherwise carried out similarly to conventional thermal emulsion polymerization except that the photopolymerization catalyst is added to the monomer or partial polymer before mixing with the water and the protective colloid and the emulsion irradiated. The mixture is vigorously stirred and illuminated in a manner similar to that described above.

Example 16

100 parts of methyl methacrylate containing 1.5 parts of alpha-chlormethyl naphthalene were mixed with 200 parts of water containing 1 part of methyl starch in a glass vessel provided with a suitable reflux condenser. The source of light was a 250 watt quartz mercury lamp at a distance of three inches from the vessel. The time of exposure was seven hours. The temperature of the vessel was maintained sufficiently elevated to cause a refluxing of the vaporized water. Constant stirring was maintained during the period of illumination. After seven hours, the granular product was separated, washed, and dried. A quantitative yield of polymer was produced.

When a similar dispersion of the monomer, but not containing the catalyst, was treated in the above manner no polymer was formed.

We may, if desired, add conventional thermal polymerization catalysts, such as the peroxide catalysts like benzoyl, lauroyl, tertiary butyl hydrogen peroxide in addition to the photopolymerization catalyst. Thus, photopolymerization may be carried on either at low or at elevated temperatures and the photopolymerized gel may be hardened further by heating the photochemically gelled product. This permits of a relatively low temperature setting of the resin to pre-bodied form or to a relatively hard casting which may then be baked at an elevated temperature.

This is equally true when laminating. Thus, the laminate may be set at relatively low temperature by photopolymerization and the laminating bond hardened by baking.

By this process not only is the clearness and the integrity of the hardened gel increased, but the photopolymerization step accelerates the total time of cure.

The rate of photopolymerization may also be increased by suitable concentrations of the catalyst as indicated above.

When oxygen is found to deleteriously affect the rate of polymerization, vessels containing the material undergoing photopolymerization may be evacuated or an inert gaseous atmosphere, as, for instance, a nitrogen atmosphere, may be employed. Matter not claimed herein is claimed in our co-pending application, Serial No. 776,871, filed September 29, 1947.

The above description and examples are intended to be illustrative only. Any modification of and variation therefrom which conforms to the spirit of the invention is intended to be included within the scope of the claims.

We claim:

1. As a new composition of matter a catalyst photopolymerizable resinophoric compound consisting essentially of an ethylenically unsaturated photopolymerizable resinophor containing dispersed therein a minor proportion of a photopolymerization catalyst consisting essentially of a halomethyl naphthalene.

2. In the composition of claim 1, said halomethyl substituent containing a halogen chosen from the group consisting of chlorine, bromine, and iodine.

3. In the composition of claim 1, said halomethyl naphthalene containing in addition to the halomethyl ring substituent a substituent chosen from the group consisting of the alkyl, alkoxy, hydroxy, halogen, and haloalkyl ring substituents.

4. As a new composition of matter, a catalyzed photopolymerizable resinophoric compound consisting essentially of an ethylenically unsaturated photopolymerizable resinophoric compound and a minor proportion of alpha-halomethyl naphthalene.

5. As a new composition of matter, a catalyzed photopolymerizable resinophoric compound consisting essentially of an ethylenically unsaturated photopolymerizable resinophoric compound and a minor proportion of alpha-chlormethyl naphthalene.

6. As a new composition of matter, a catalyzed photopolymerizable resinophoric compound consisting essentially of an ethylenically unsaturated photopolymerizable resinophoric compound and a minor proportion of alpha-bromomethyl naphthalene.

7. As a new composition of matter, a catalyzed photopolymerizable resinophoric compound consisting essentially of an ethylenically unsaturated photopolymerizable resinophoric compound and a minor proportion of beta-holomethyl naphthalene.

8. As a new composition of matter, a catalyzed photopolymerizable resinophoric compound consisting essentially of an ethylenically unsaturated photopolymerizable resinophoric compound and a minor proportion of beta-chlormethyl naphthalene.

9. As a new composition of matter an ethylenically unsaturated resinophor containing dispersed therein from about .001% to about 5% of a halomethyl naphthalene.

10. The composition of claim 9, the resinophor being methyl methacrylate.

11. A process of photopolymerization comprising the steps of dispersing in an ethylenically unsaturated photopolymerizable resinophor from about .001% to about 5% of a photopolymerization catalyst consisting essentially of halomethyl naphthalene and irradiating the same by actinic light to polymerize the resinophor.

12. The process of claim 11, the halomethyl substituent containing a halogen chosen from the group consisting of chlorine, bromine, and iodine.

13. The process of claim 11, the halomethyl naphthalene containing a second substituent chosen from the group consisting of the alkyl, alkoxy, hydroxy, halogen and haloalkyl ring substituents.

14. The process of photopolymerization comprising the steps of dispersing in an ethylenically unsaturated photopolymerizable resinophoric compound from about .001% to about 5% of alpha-halomethyl naphthalene, and irradiating the same by actinic light to polymerize the resinophor.

15. The process of photopolymerization comprising the steps of dispersing in an ethylenically unsaturated photopolymerizable resinophor from about .001% to about 5% of alpha-chlormethyl naphthalene, and irradiating the same by actinic light to polymerize the resinophor.

16. The process of photopolymerization comprising dispersing in an ethylenically unsaturated photopolymerizable resinophor from about .001% to about 5% of alpha-bromomethyl naphthalene, and irradiating the same by actinic light to polymerize the resinophor.

17. The process of photopolymerization comprising the steps of dispersing in an ethylenically unsaturated photopolymerizable resinophoric compound from about .001% to about 5% of beta-halomethyl naphthalene, and irradiating the same by actinic light to polymerize the resinophor.

18. The process of photopolymerization comprising the steps of dispersing in an ethylenically unsaturated photopolymerizable resinophor from about .001% to about 5% of beta-chlormethyl naphthalene, and irradiating the same by actinic light to polymerize the resinophor.

19. A process of photopolymerization comprising the steps of dispersing in methyl methacrylate from about .001% to 5% of halomethyl naphthalene and irradiating the same by actinic light to polymerize the methyl-methacrylate.

20. As a new composition of matter, a catalyzed photopolymerizable resinophoric compound consisting essentially of ethylenically unsaturated photopolymerizable resinophoric compound and from about .001% to about 5% of alpha-halomethyl naphthalene.

21. In the composition of claim 20 the resinophor being methyl methacrylate.

22. As a new composition of matter, a catalyzed photopolymerizable resinophoric compound consisting essentially of ethylenically unsaturated photopolymerizable resinophoric compound and from about .001% to about 5% of alpha-chlormethyl naphthalene.

23. As a new composition of matter, a catalyzed photopolymerizable resinophoric compound consisting essentially of ethylenically unsaturated photopolymerizable resinophoric compound and from .001% to 5% of alpha-bromomethyl naphthalene.

24. As a new composition of matter, a catalyzed photopolymerizable resinophoric compound consisting essentially of ethylenically unsaturated photopolymerizable resinophoric compound and from .001% to 5% of beta-halomethyl naphthalene.

25. As a new composition of matter, a catalyzed photopolymerizable resinophoric compound consisting essentially of ethylenically unsaturated photopolymerizable resinophoric compound and from .001% to 5% of beta-chlormethyl naphthalene.

26. The composition of claim 1, the resinophor being methyl methacrylate.

CARROL C. SACHS.
JOHN BOND.

REFERENCES CITED

The following references are of record in the file of this patent:

UNITED STATES PATENTS

| Number | Name | Date |
|---|---|---|
| 1,891,203 | Ambros et al. | Dec. 13, 1932 |
| 2,207,686 | Schwarcman | July 9, 1940 |
| 2,326,736 | Adelson et al. | Aug. 17, 1943 |